June 30, 1953     L. R. CARTIER     2,643,525
ABSORBER FOR USE IN TREATING GASES
Filed May 15, 1947
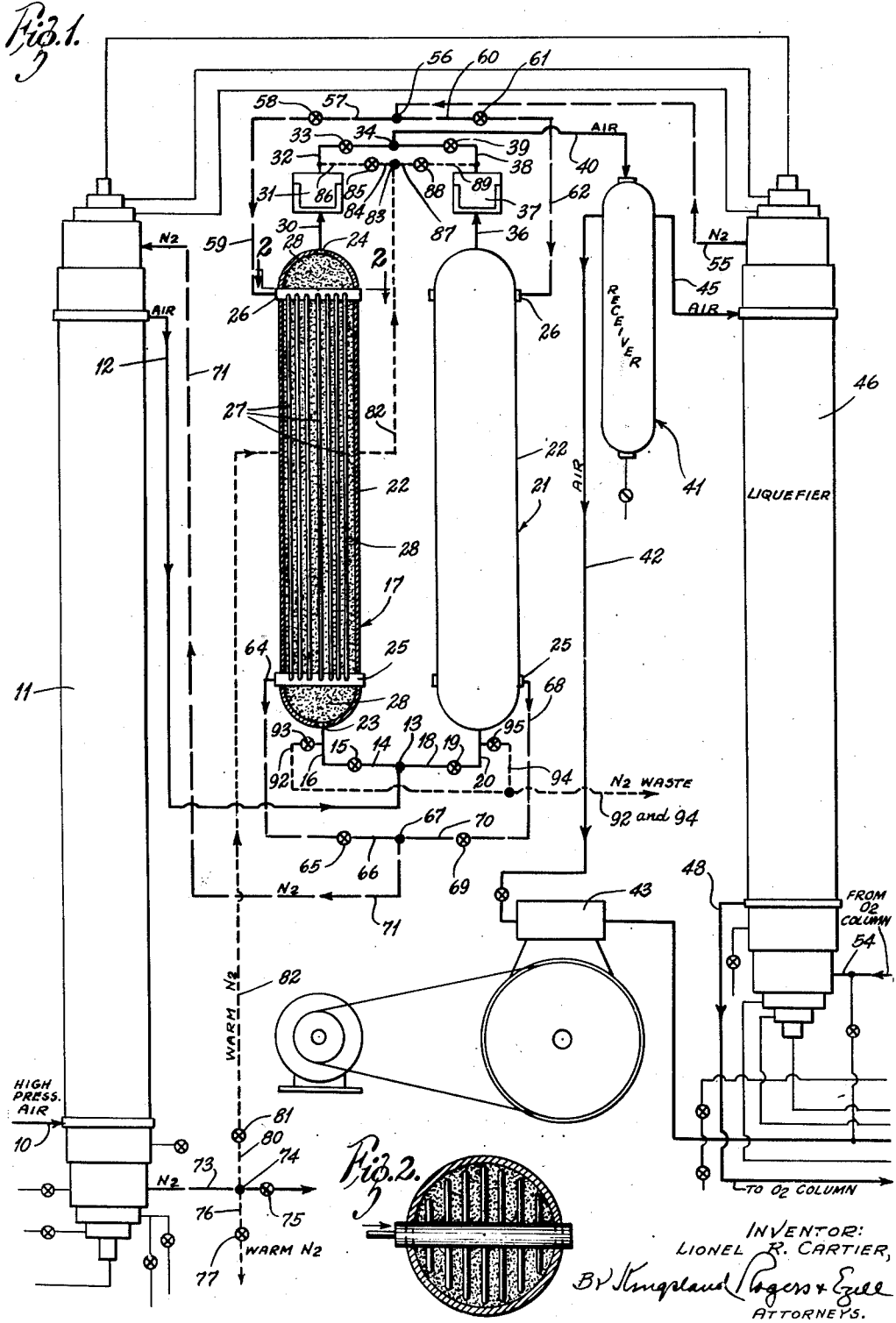
INVENTOR:
LIONEL R. CARTIER,
ATTORNEYS.

Patented June 30, 1953

2,643,525

UNITED STATES PATENT OFFICE 2,643,525

ABSORBER FOR USE IN TREATING GASES

Lionel R. Cartier, O'Fallon, Ill.; Effie Mae Cartier and Norman J. Gundlach, executors of said Lionel R. Cartier, deceased, assignors to Independent Engineering Company, Inc., O'Fallon, Ill., a corporation of Illinois Application May 15, 1947, Serial No. 748,269

1 Claim. (Cl. 62—175.5)

The present invention relates to absorbers for use in treating gases. More particularly, it is related to absorbers such as hydrocarbon absorbers for use in withdrawing hydrocarbons and related foreign materials from gases.

A particular use of this invention is in connection wtih the production of oxygen, wherein it is desirable to remove hydrocarbons and related foreign substances from air that is being treated by a refrigerating system to separate out the oxygen therefrom.

It is an object of the invention to provide absorbers of the foregoing type that may be subjected to cooling for the purpose of rendering an absorbing medium capable of absorbing the products, and alternately subjected to warming to cause the medium to yield up its hydrocarbons for being conveyed away from the oxygen producing system.

A particular object of the invention is to provide a dual or multiple system of absorbing devices, through which the gas, such as air, to be treated can be passed, and through which also may be passed a cooling medium that will maintain the absorbing substance cold so that it may withdraw the undesired foreign substances from the air, which system includes a means for passing a warmed gas through another absorbing device not then in use to withdraw the absorbed hydrocarbons therefrom and convey them out of the system.

A particular object of the invention is to provide such a dual or multiple system in which one of the absorbing devices may be used for its absorbing functions while another or others are being reactivated. A particular object of the invention is to provide such a system wherein the gas, such as air, being treated for the removal of absorbable foreign substances is passed through one absorber simultaneously with the passing therethrough of a cold gas, such as cold nitrogen, out of the oxygen producing system, and wherein simultaneously another warm gas, such as warm nitrogen from the system, is passed through another absorber to revaporize the hydrocarbons previously absorbed thereby and to conduct them out of the system. Another object is to provide the foregoing two or more absorbers with connections so that they may be reversed to maintain a continuously operable absorbing system.

In the drawing:

Fig. 1 is a schematic view of the present invention, showing its connection with certain parts of an oxygen producing system; and Fig. 2 is a section on the line 2—2 of Fig. 1, through one of the absorbing elements.

As shown in Fig. 1, an oxygen producing system includes a high pressure air inlet 10, indicated at the lower left hand corner. In this view, the air flow paths are shown in heavy black lines. This high pressure air may be derived from one of the conventional sources of air, such as from a compressor. It is introduced into a heat exchanger 11 that has separate compartments through which it may flow and other compartments through which other gases may flow, as will appear.

An air outlet 12 leads from the heat exchanger 11 to a T 13 of a valved piping network for the absorbers. From the T 13, a left-hand line 14 leads to a hand valve 15. This hand valve is connected by a line 16 into the bottom of one of the absorbers 17.

From the T 13, a right-hand line 18 leads to a hand valve 19, from which a pipe 20 connects into the bottom of another absorber 21 that preferably is identical with the absorber 17.

Each absorber includes two separate gas passage parts. Each absorber has an outer shell 22 having an opening 23 at its bottom and an opening 24 at its top. Within the shell are a lower header 25 and an upper header 26 that are connected by a plurality of heat-exchange tubes 27. The shell or casing is filled with a suitable absorbing medium 28, such as alumina. This has the characteristic of being able to absorb hydrocarbons and related foreign products when they are cold, and to yield them up again when warmed.

Thus the air that is charged into the absorber 17 from the line 16 flows upwardly through the opening 23, through the absorbing medium 28 that is contained within the shell 22, around the tubes 27, and out the opening 24.

The absorber 17 has an air outlet 30 connected from the opening 24, that leads through a porous metallic filter device 31, for removal of foreign particles, from which a pipe 32 extends to a hand valve 33 and thence to a T 34. Similarly, the absorber 21 has an air outlet 36 that leads through a device 37, from which a pipe 38 leads to a hand valve 39, the other side of which is connected to the T 34.

The T 34 is connected to an air line 40 that leads into the oxygen producing system. Such system is here indicated by the presence of a receiver 41. From this receiver, there is an air outlet 42 that leads into an expansion engine 43 of the type conventionally used in oxygen producing systems. Another part of the air from the receiver 41 may pass through a pipe 45 into a liquefier 46. This liquefier contains an air pass therethrough in heat transfer relation with additional gas passages. It has an air outlet 48 that leads into another part of the oxygen producing system. Ultimately the engine discharges the air at much reduced pressure and temperature into the bottom of an oxygen column.

The air line 45 leading from the receiver is here shown as entering the liquefier where it is subjected to the cooling effects of return gases from the column, and is to a large extent liquefied. The outlet line 48 of this liquefier may likewise lead into the oxygen column.

As is known in the art, the oxygen column produces liquid and vapor oxygen, and also produces vaporized nitrogen at very low temperatures. Such nitrogen is conventionally discharged through heat exchangers to cool inflowing air or other component gases or liquids produced in the system.

As here shown, there is a return nitrogen line 54, indicated in the lower right-hand side of Fig. 1. In Fig. 1, the cold nitrogen flow path is indicated by long dash lines. This nitrogen entering at 54 is relatively very cold, and passes through a pass in the liquefier where it may absorb heat from incoming air and liquefy the same in whole or in part. The nitrogen leaves the liquefier 46 by a pipe 55 that leads to a T 56. From this T, a left-hand line 57 leads to a hand valve 58, from which a pipe 59 leads to the header 26, and thence into the tubes 27 of the absorber 17.

Also, from the T 56, a right-hand pipe 60 leads to a hand valve 61, from which a pipe 62 leads into the tubes of the absorber 21.

The nitrogen outlet from the absorber 17 comprises a pipe 64 that leads from the header 25 to a hand valve 65, from which a pipe 66 leads to the T 67. The outlet from the absorber 21 includes a pipe 68 that leads to a hand valve 69, the other side of which is connected by a pipe 70 to the T 67.

The T 67 has a common discharge pipe 71 that leads into the top of the heat exchanger 11. As is diagrammatically indicated, the pipe 71 leads into a middle pass of this heat exchanger.

The principal nitrogen outlet from the heat exchanger 11 is a pipe 73 leading to a cross T 74. From this T 74, there is a discharge line having a discharge valve 75 therein, through which the nitrogen may be exhausted or led to some suitable point. There is another line 76 having a valve 77 therein also connected to this T. The line 75 leads to some other processing element forming no part of the present invention. See, for instance, the duo-driers as disclosed in co-pending application Serial No. 721,508, filed January 11, 1947.

There is a reactivating warm nitrogen line that also runs from the T 74. The warm nitrogen flow path is indicated by short dash lines. This includes a pipe 80 leading to a manual valve 81. The other side of this valve is connected by a pipe 82 to a T 83. From this T, a left-hand line 84 runs to a hand valve 85, from which a pipe 86 connects into the pipe 32 leading into the top of the absorber 17. From the T 83, a right-hand line 87 leads to a hand valve 88, the other side of which is connected by a pipe 89 into the right-hand line 38 leading into the top of the absorber 21.

There is an outlet for the reactivating nitrogen. This, for the left-hand absorber 17, includes a line 92 that has a hand valve 93 therein. For the right-hand absorber 21, there is a line 94 having a hand valve 95 therein, the line 94 connecting into the line 92. As indicated, these may lead to atmosphere or they may be connected to any suitable storage point or other place for the disposition of this nitrogen.

*Operation*

Generally speaking, the three gas components that are directed through the absorbers 17 and 21 include the air, the cold nitrogen and the reactivating nitrogen. As here shown, the immediate source of the air is from the heat exchanger 11, but this exchanger, in turn, receives its air from the line 10, which derives air under high pressure from a compressing mechanism.

The ultimate discharge of this air from the absorbers is the oxygen column, which is not here shown. However, the immediate discharge of the air is into the receiver and into the liquefier. This liquefier likewise is the immediate source of the returned cold nitrogen. Hence the liquefier 46 typifies a part of a mechanism for the separation of oxygen and nitrogen, thus typifying the mechanism including the column itself. It also may be designated as a device or means into which the air is discharged, or as a device or means from which cold nitrogen is obtained. Also, in its own right, it may be designated as a liquefier or heat-exchange medium.

The source of warm nitrogen is the heat exchanger 11. However, this nitrogen may be drawn from other sources from which warm nitrogen is available. Furthermore, it is not essential that nitrogen be used as the reactivating gas, although its use has certain advantages for this purpose as are obvious. Among the advantages is the fact that warm nitrogen is ordinarily a waste product.

When the system is in operation, high pressure air is being introduced by the line 10 into the heat exchanger 11. In this exchanger, it is somewhat cooled and is discharged by the pipe 12 to the T 13.

In the initial set-up, it will be assumed that the absorber 17 is operating to withdraw hydrocarbons from the air, and that the absorber 21 is being reactivated following an earlier absorbing cycle through it. Under such circumstances, the hand valve 15 is open, the hand valve 93 closed, so that the air may be passed into the absorber 17. At this time, the hand valve 19 is closed so that the cooled air is not admitted to the absorber 21. With this arrangement, the air passes up through the inlet 23 of the absorber 17, and into the casing 22, through the absorbing medium, which may be alumina or some other suitable product, around the tubes 27, and out the upper opening 24. This alumina is cold, and absorbs the hydrocarbons and related foreign substances from the high pressure air. The purified air leaves the absorber 17 by the pipe 30, passing through the device 31 and into the line 32. At this time, the hand valve 33 is open and the hand valve 85 closed, so that this air passes to the T 34. Also, at this time, the hand valve 39 is closed, so that the air is forced to pass out the pipe 40 to the receiver 41.

From the receiver 41, the air is, in the illustration, divided so that part of it flows by way of the line 42 to the refrigerating engine 43, where its pressure is sharply reduced, and its temperature correspondingly reduced. It is delivered from this engine to some suitable point in the system, such as a first stage in the column.

From the receiver, another part of the high pressure and purified air is delivered by the line 45 into the liquefier 46, where it is at least partially liquefied and then delivered by the line 48 to some part of the system, such again as the first stage of the oxygen column.

In the meanwhile, as is well understood, the oxygen column is delivering nitrogen at a temperature normally somewhat below the boiling point of oxygen. This cold nitrogen, with a possible intervention of certain heat interchangers, subcoolers and the like, is delivered to the line 54 at the bottom of the liquefier 46. From this liquefier, it is delivered through the line 55 to the T 56. At this time, the valve 58 is open, so that the nitrogen flows through the line 57 past the valve 58 and through the line 59 into the header 26 and the tubes 27 of the absorber 17. At this time also, the right-hand valve 61 is closed, so that this cold nitrogen cannot flow into the right-hand absorber 21. The cold nitrogen from the fractionators thus constitutes the cooling means for the absorbers, in the preferred arrangement. It will be understood that in some systems the cooling fluid may derive from other sources.

As the nitrogen flows through the tubes 27 and finally leaves by way of the header 25 and the pipe 64, it cools the air flowing upward through the absorber 17, thereby maintaining the agent cold so that it can absorb and hold the hydrocarbons and the like, and also cooling the air. The nitrogen then leaves by way of the pipe 64 and past the now open valve 65. From this valve 65 it passes by way of the line 66 to the T 67. The hand valve 69 in the right-hand line 70 is closed, so that the nitrogen, somewhat warmed, flows from the T 67 through the line 71 into the nitrogen pass of the heat exchanger 11. It flows through this heat exchanger, thereby cooling the incoming air somewhat, and finally discharges through the line 73 to the cross 74, at which point it is relatively warm. From the cross 74, it may flow, in whole or in part, through the valve 75 and the line 76 and the valve 77 to the duo-driers, where it may be used to reactivate them.

At this same time, this nitrogen at the cross 74 is warm enough to reactivate the agent in the absorber 21 that is not at this time receiving and treating air. Hence a portion of this warm nitrogen flows through the line 80 past the hand valve 81, and through the line 82 to the T 83. From this point, it will flow through the valve 88, the valve 85 being closed. From the hand valve 88, it flows through the line 89 and into the pipe 38. As already noted, the valve 39 is closed. Hence the warm nitrogen then flows through the line 36 into the top of the absorber 21, counter to the flow of air therethrough. Being warmed, this nitrogen can then heat up the absorbing agent, causing the same to volatalize the hydrocarbons which mix into the nitrogen. Enough nitrogen is caused to flow through the absorber to take up the hydrocarbons. It then emits through the discharge line 20. The valve 95 is open at this time and the valve 19 is closed, so that this nitrogen flows out through the line 94 to the line 92, and then may be discharged into the atmosphere or otherwise used as desired. At this time, the valve 93 is closed. This warm nitrogen constitutes the preferred warming means for the inactive absorber. Other heating means, and even heating units unrelated to the oxygen producing system, may be used, but the use of this otherwise relatively valueless nitrogen has the obvious advantages.

The foregoing flow paths will be maintained for such period of time as the agent within the shell or casing and the absorber 17 remains capable of taking off the hydrocarbons. When the absorber becomes saturated, the two absorber devices 17 and 21 are reversed. This may be accomplished by manipulation of the valves 15, 93, 19, 95, 33, 85, 39 and 88. When these hand valves are reversed, the air will then flow upwardly through the absorber 21, and thence outwardly to the receiver 41. At the same time, the cold nitrogen will backflow through the line 62 and the absorber 21, and ultimately out to the heat exchanger 11. Also, the warm nitrogen will flow from the T 83 through the left-hand absorber 17, and thence to the atmosphere.

In making this change-over, it is ordinarily necessary to relieve the high pressure conditions in the absorber that is receiving air gradually, and likewise to introduce the high pressure into the other absorber gradually, so as not to injure the absorbing medium.

To do this, the following procedure may be adopted: When the absorber 17, which has theretofore been operating under high pressure, is to be reversed so that it receives the hot nitrogen under relatively low pressure, the valves 15 and 33 are first closed, trapping the high pressure air within the absorber. The hot nitrogen flow into the other absorber 21 is cut off by closing the valves 88 and 95. Then the valve 93 is cracked open to permit some of the high pressure air to escape to atmosphere out the line 92, gradually reducing the pressure in the absorber 17 to that of the warm nitrogen from the line 82. When the pressure is thus reduced, as may be indicated by gauges suitably placed, the valve 85 is opened and the warm nitrogen is then directed through the absorber 17.

In the meanwhile, the cold nitrogen will be cut off from this absorber by the closure of the valves 58 and 65. Also, the valves 61 and 69 will be open so that this cold nitrogen may flow then through the other absorber 21 and continue to supply cold nitrogen which becomes heated and ultimately is available as warm nitrogen from the cross 74.

The pressure in the absorber 21 is built up gradually by cracking the valve 19, with or without the valve 39 open, and gradually building up the pressure 21 until it equals that in the system. When it is at such point, the valves 19 and 39 may be fully opened, after which the absorber 21 will be in use, and the absorber 17 will be under reactivation. By this arrangement, there need be no break in the flow of air to the liquefier and ultimately to the oxygen forming system.

It will be seen that the foregoing arrangement also provides for the conservation of energy, in that the cold nitrogen is employed to keep the absorbing agent at a proper temperature to absorb the maximum amount of hydrocarbon, and to keep the same absorbed; and that this nitrogen is then further used for additional pre-cooling of the air. Finally, it is available as warm nitrogen for the reactivation of the absorber not in use. In this system, also, the absorption takes place after the air is partly cooled, but before it is liquefied, so that the hydrocarbons are not present in the liquid air.

What is claimed is:

A method of removing hydrocarbons, and the like, from air in two containers comprising passing air under pressure through a heat exchanger, directing the air through an absorber in one container, and cutting it off from the other, passing the air from said one container and separating oxygen from nitrogen therein by temperature fractionation, obtaining cold nitrogen from said fractionation, directing the nitrogen through the air-receiving container in separated heat-transfer relationship therewith, while cutting it off from the other container, passing it from the other container through the heat exchanger to precool air therein and to warm the nitrogen, passing the warmed nitrogen from the heat exchanger through the container cut off from the air to take up hydrocarbons in the absorber therein, and changing the flow of the air, cold nitrogen and warm nitrogen to the opposite containers when the absorber in that one receiving air has become charged with hydrocarbons.

LIONEL R. CARTIER.

References Cited in the file of this patent

UNITED STATES PATENTS

| Number | Name | Date |
|---|---|---|
| 1,842,263 | Gobert | Jan. 19, 1932 |
| 1,948,779 | Abbott et al. | Feb. 27, 1934 |
| 2,337,474 | Kornemann et al. | Dec. 21, 1943 |

FOREIGN PATENTS

| Number | Country | Date |
|---|---|---|
| 257,372 | Great Britain | Sept. 2, 1926 |
| 365,390 | Great Britain | Jan. 21, 1932 |
| 469,943 | Great Britain | Aug. 3, 1937 |